Figure 1:
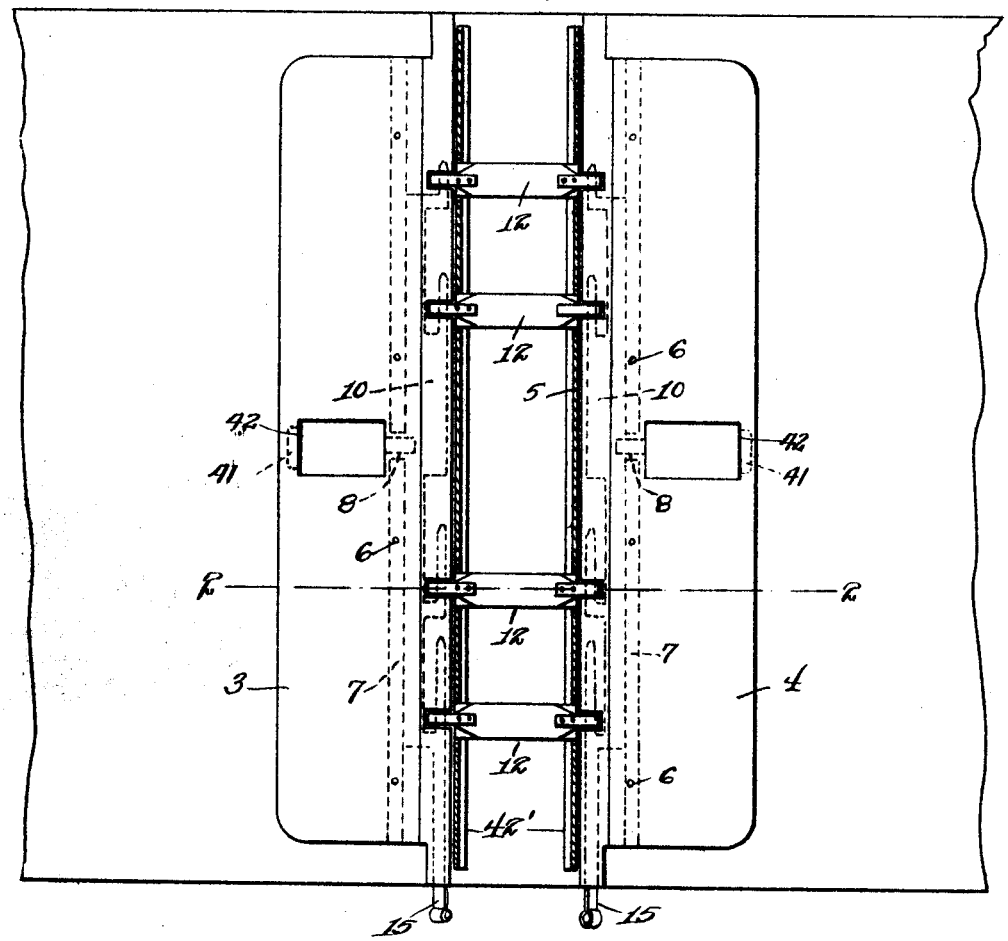

G. W. THOMAS.
LOOSE LEAF BINDER FRAME AND LOCK THEREFOR.
APPLICATION FILED APR. 8, 1914.

1,164,031.

Patented Dec. 14, 1915.
3 SHEETS—SHEET 1.

Witnesses
W. H. Mulligan
W. E. Walker

Inventor
George W. Thomas
By
Richard Bowen
his Attorney

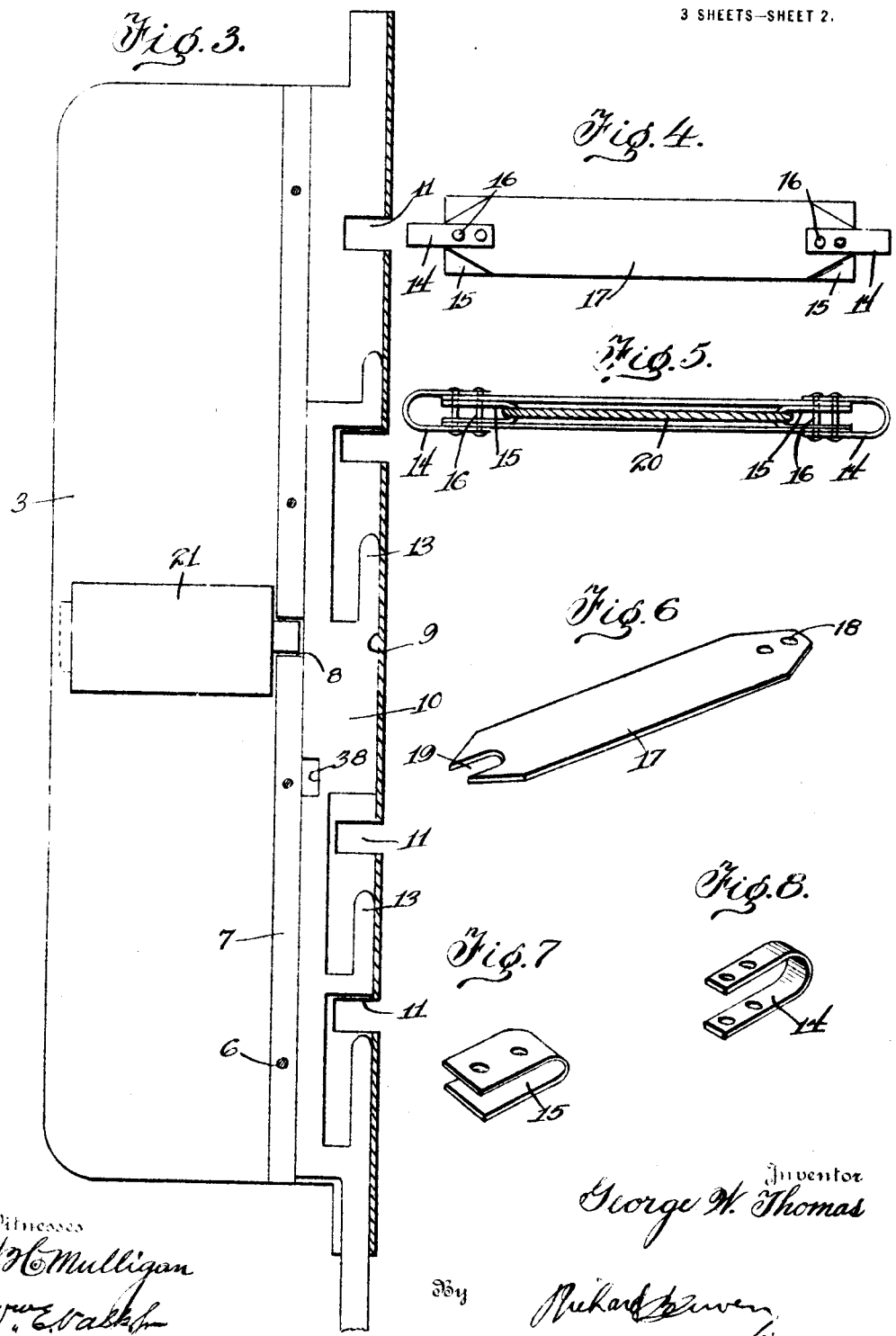

G. W. THOMAS.
LOOSE LEAF BINDER FRAME AND LOCK THEREFOR.
APPLICATION FILED APR. 8, 1914.
1,164,031.
Patented Dec. 14, 1915.
3 SHEETS—SHEET 3.
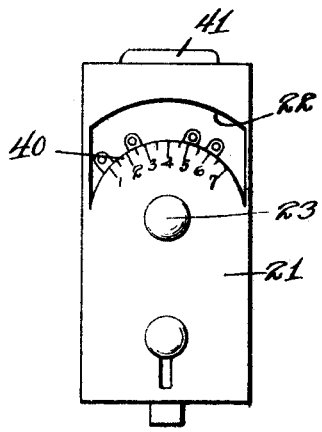
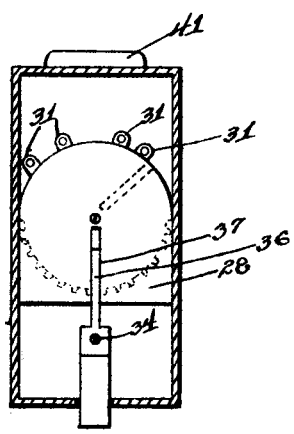
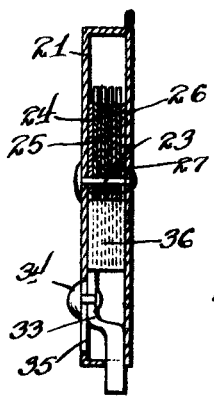
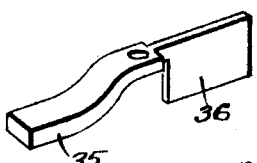
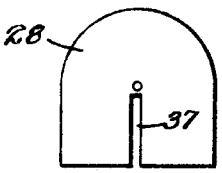
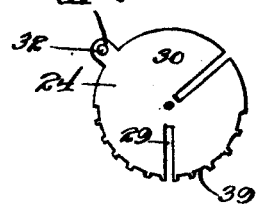

UNITED STATES PATENT OFFICE.

GEORGE W. THOMAS, OF RED OAK, IOWA, ASSIGNOR TO INTERNATIONAL BLANK BOOK COMPANY, A CORPORATION OF SOUTH DAKOTA.

LOOSE-LEAF BINDER-FRAME AND LOCK THEREFOR.

1,164,031.   Specification of Letters Patent.   Patented Dec. 14, 1915.

Application filed April 8, 1914. Serial No. 830,491.

*To all whom it may concern:*

Be it known that I, GEORGE W. THOMAS, citizen of the United States, residing at Red Oak, in the county of Montgomery and State of Iowa, have invented certain new and useful Improvements in Loose-Leaf Binder-Frames and Locks Therefor, of which the following is a specification.

This invention consists of means for binding loose leaves, or the like, between the covers of a book, or similar inclosure, including record books, ledgers, account books, etc.

In the keeping of record and account books, modern business methods contemplate the use of separate or individual sheets or leaves, usually typewritten, adapted to be subsequently bound in a book or volume; such typewritten record or account sheet being preferred for many reasons, among them being the greater legibility of the writing; the saving in space, time and labor; and the decrease in the cost of preparing the records and the charges and space for storing such records or accounts.

The object of the invention is to provide means for binding such individual sheets, typewritten or otherwise, in a secure, compact and durable manner; the sheets or leaves being locked in place for greater security, whereby a permanent record is produced which cannot be tampered with, or altered; a record of this character being especially desirable for legal, mercantile, and other purposes.

The new binder of my invention possesses many advantages from the practical standpoint. It can be unlocked and then opened for ready introduction of additional leaves or pages only by a party having the proper combination necessary to operation of the lock. All of the parts are connected, in the sense that no one part is loose or detachable, thus overcoming the objection to the use of separable parts which may become lost or mislaid.

The lock is so constructed as to provide for its removal bodily by a predetermined shifting of one of the tumblers forming a part thereof.

The device is simple and strong in construction, durable and efficient in service, and readily applied to the cover of a book so as to form a complete binder therefor.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 2:
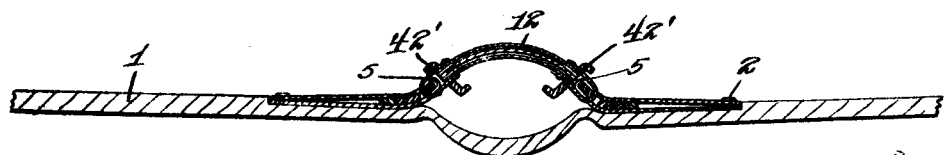

Figure 1 is a plan view of a binder frame constructed in accordance with the present invention, the protector strip forming a part thereof being shown in section; Fig. 2 is a section on the line 2—2 of Fig. 1; Fig. 3 is a longitudinal sectional view of one of the metal side plates; Fig. 4 is a plan view of one of the binder strips; Fig. 5 is an edge view of one of the said strips; Fig. 6 is a detail perspective view of one of the protector plates forming a part of the said binder strips; Fig. 7 is a detail perspective view of one of the metallic clasps; Fig. 8 is a detail perspective view of one of the metallic eyelets; Fig. 9 is a top plan view of the combination lock; Fig. 10 is a similar view, the lock casing being shown in section; Fig. 11 is a longitudinal sectional view of the lock; Fig. 12 is a detail perspective view of the locking bolt; Fig. 13 is a plan view of one of the stationary disks; and Fig. 14 is a similar view of one of the tumblers.

Before proceeding with the description of the drawings, I desire to call particular attention to Patent #1,033,356 issued July 23, 1912, for the reason that the present invention is designed as an improvement thereover.

Referring now to the drawings by numerals, 1, designates as an entirety, the binder frame to which is riveted or otherwise permanently secured as indicated at 2, the respective side plates 3 and 4. The detail construction of each plate being the same, I shall proceed with the detail description of but one, the numerals however being applicable to both. Each plate is formed by bending an elongated strip of sheet metal as indicated at 5, the sides formed by the bending of the metal being made fast to each other as indicated at 6, a metallic strip 7 being interposed therebetween. Said plate after having been shaped or bent in the manner above described is bodily bent as shown in Fig. 2 at an angle of about 40° to cause, upon an opening of the binder frame, the bound margin of the sheets to be turned outwardly or away from the flexible portion of said frame. Said strip 7 is divided centrally as indicated at 8 for a purpose to be hereinafter fully set forth. A way 9 is formed between the bend 5 and the strip 7, said way 9 having a bodily slidable fastening member 10 disposed therein. The bent longitudinal edge of both plates 3 and 4 is cut away as indicated at 11, preferably at various points throughout its length. The respective extremities of the binder strips, designated as an entirety by the numeral 12, fit the respective cut out portions or openings 11, said strips being maintained immovable with respect to the said plates by reason of their engagement with the locking or fastening member 10. Retaining pins 13 varying in length are formed integrally with the fastening member 10 in suitable spaced relation, the said pins, in the normal position of the said member, passing through flat eyelets 14 upon the respective ends of the binder strips 12. Said pins 13 are also flat and when in engagement with the eyelets maintain the strips 12 not only immovable with respect to the plates 3 and 4, but also, upon an opening of the completed book, cause the binding strips to be turned outwardly as illustrated in Fig. 2. It is further apparent, upon reference to the said Fig. 2, that the said eyelets, when within the openings or cut out portions 11, and engaged by the retaining pins 13, are locked immovable until disengaged by the said pins, the latter being made possible by a sliding of the member 10. Said member 10 is extended at one end and provided with a handle 15, the latter being without the way 9 as indicated in Fig. 1.

It is apparent upon reference to Figs. 1 and 3 that the pins 13, in assembling the device are successively forced through the respective eyes thereby making it unnecessary, as heretofore, to cause all of the eyelets to be alined before movement of the locking element can be effected.

The binder strips 12 are constructed or formed as follows: The eyelets 14 are first positioned in spaced relation, yokes 15, substantially U-shaped, being fitted, one between the extensions of each of the said eyelets, the latter being also substantially U-shaped as indicated in Fig. 7. Pins 16 connect the respective extensions of the eyelets 14 and yokes 15, a protector plate 17, of resilient metal, being first interposed between each extension of the eyelets and yokes to maintain the same in the desired spaced relation. One end of the plate 17 is perforated as at 18 through which perforations the pins or bolts 16 extend, while the opposite end of the said plate is slotted as at 19, the pins 16 in the opposite end of the binder strip passing through said slot, which arrangement, upon practical application of the invention, will provide for the bending of the strips as occasion may demand. A cord or like flexible element 20 connects the respective yokes 15, the cord being between the plates 17, the latter serving as a protecting element therefor. The construction and arrangement of the elements comprising the binder strip is illustrated to special advantage in Figs. 4 to 8 inclusive.

Passing on to the description of the means or mechanism employed for locking the member 10 immovable with respect to its support, the numeral 21 designates a suitable lock casing, the top of which is open as indicated at 22. Within said casing 21 and mounted for rotation upon a pin 23 are a plurality of rotatable tumblers designated respectively 24, 25, 26 and 27, the former, or the tumbler 24 being hereinafter referred to as the major tumbler. Disks 28, immovable with respect to the casing are interposed, one between each of the respective tumblers, the pin 23 extending concentrically through the several disks. Each tumbler is provided with a slot 29 extending from its periphery to a point in spaced relation to its axis of rotation, the major tumbler 24 however, being provided with a second slot 30 somewhat longer than the slot 29 aforesaid. Each tumbler is also provided with an extension 31, the several extensions being visible through the opening 22, the latter being arcuate as indicated in Fig. 9. Each extension is provided with an opening 32 whereby any suitable element may be inserted therein to provide for movement of the tumblers, whereby to shift same in a manner necessary to operation of the lock.

A locking bolt or keeper 33 is mounted for sliding movement within the casing 21, said bolt having a knob 34 secured thereto, the latter being disposed exteriorly of the casing, its shank operating within a slot 35 of the casing top. The inner end of the bolt 33 is enlarged as at 36 and, in the operation of the lock, is forced into the slots 29 of the tumblers and into the alined slots 37 of the disks to provide for the withdrawal of the extended or projected end of the bolt from its normal position within a cut out portion 38 of the member 10, said bolt operating in the space 8 between the sections of which the strip 7 is composed. If desired, the periphery of the several tumblers may be notched as at 39 to prevent "feeling" in an attempt at working the lock combination by an unauthorized party.

Indicating marks 40, preferably ranging from one to seven, are stamped or otherwise delineated upon the casing top 21 to indicate, in the operation of the lock, the position at which the extensions 31 of the several tumblers should be set to aline the slots 29 whereby to provide for a sliding of the bolt 33. When the said slots 29 are alined with the already alined slots 37 of the disks 28, it is apparent that the said bolt 33 may be slid until the enlarged portion 36 thereof engages the inner end of the slot 29 of the major tumbler 24, in which event the said bolt may be withdrawn from its engagement with the member 10, but not sufficiently to disengage the same from the space 8 between the sections of the strip 7. Movement of the major tumbler 24 until the slot 30 thereof is alined with the slots 29 of the remaining tumblers and the slots 37 of the disks, will allow the enlarged portion 36 of the bolt to be bodily moved a sufficient distance to permit the said bolt to be withdrawn from its position within said space 8, in which event, the entire lock may be bodily moved as one of the sides of the plate supporting the same is cut away to provide for such bodily removal.

A tongue 41 is integral with the casing and is adapted, in the normal position thereof to fit a slot 42 formed in one of the plate sides, this construction providing for the retention of the said lock immovable with respect to the side plates, the locking bolt 33 by reason of its position within the space 8 and its engagement with the side of the said plate, serving as a retaining means for the opposite end of the lock from that upon which the said tongue 41 is formed.

Protector strips 42' may be arranged over the binder strips 12, one adjacent each of the respective longitudinal edges of the side plates 3 and 4, said strips serving as a support for the looose leaves (not shown) and preventing frictional engagement between the outside leaves and the said side plates 3 and 4.

When it is desired that a loose leaf be removed, from between the sides of the binder frame 1, or when it is desired that a new leaf be bound therebetween, operation to unlock one of the members 10 is as follows: The combination of the present lock is "one, six, two and a half, and five." The major tumbler 24 is first shifted or rotated until the extension 31 thereof is alined with the indicating mark number "1" on the face of the casing. Tumbler 25 is next shifted or rotated until its extension is alined with the numeral "6" on the casing. Tumbler 26 is next shifted or rotated until its extension is alined with the mark indicating two and a half on the casing, and finally, tumbler 27 is shifted or rotated until its extension is alined with the numeral "5." The said tumblers having been thus positioned or shifted, the respective slots 29 thereof are alined with the slots 37 of the immovable disks, whereby to effect a way within which the enlarged portion 36 of the bolt 33 is slid. Such sliding movement of the bolt 33 will withdraw the same from the cut out portion 38 of the member 10, in which event said member 10 may be bodily slid within the way 9 by manipulation of the handle 15. Sliding movement of the member 10 until the retaining pins 13 disengage the eyes 14 of the binding strips, will provide for the unlocking of the said strips simultaneously, thereby permitting the removal of any number of loose leaves or the insertion thereupon of additional leaves. The manner in which the said binding strips are again locked is apparent.

When it is desired that the entire lock casing 21 be removed, the tumblers are set or shifted in the manner above described, and, when so set, the major tumbler 24 is moved from its position indicated in Figs. 9 and 14 until the extension 31 thereof is alined with the numeral "7" of the graduation marks, in which event, the slot 30 is alined with the slots 29 of the remaining tumblers and the slots 37 of the immovable disks, and, as all of the said slots are of the same length, the bolt 33 may be slid or shifted until entirely withdrawn, not only from the cut out portion 38 of the member 10, but from the space 8 between the sections of the strip 7. The said bolts being withdrawn from the said space 8, the casing 21 may be bodily removed, by withdrawing the tongue 41 from the slot 42 therefor.

From the above, taken in connection with the accompanying drawings it is apparent that a removal of any of the loose leaves can not be effected other than by a party informed of the proper combination necessary to operation of the lock; that a single operation of the lock, will provide for, first, the unlocking of the member 10, and second, for the unlocking of the casing 21 within which the lock mechanism is arranged; and that by disposing, the respective plates 3 and 4, one upon each side of the binder frame, either or both ends of the binder strips 12 may be unlocked to provide for the removal or insertion of leaves either at the back or front of the book. Attention is also called to the fact that the strips are both successively locked and unlocked; and that the curvature of the side plates 3 and 4 together with the flat pins and eyelets will cause the binding strips to be turned or curved outwardly upon an opening of the completed book.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a frame for binding loose leaves, a plate member rigid with said frame, said plate member being bent longitudinally, a strip interposed between the bent portions of said members, the said bent portions being made rigid one with the other and with the strip, the said strip adapted to define a way extending longitudinally of said member, a locking element slidable in said way, a plurality of retaining pins integral with said element, the said member having a plurality of openings formed therein across which the said pins are adapted to normally extend, means normally maintaining said element against sliding movement, and a plurality of binding strips fitting the respective openings and engaging the respective retaining pins.

2. In a loose leaf binder, the combination with a locking element, of a plurality of binding strips engageable with said element, said binding strips each comprising a pair of parallel spaced resilient plates, yokes interposed between said plates, said yokes being disposed at the respective ends thereof, flexible means connecting said clamps, and eyes rigid with said plates, said eyes being disposed one at each end of said strips, the said eyes being engageable with the said locking element.

3. In a loose leaf binder, a frame, a pair of metallic side plates rigid with said frame, a locking member slidable upon each plate, independent locking means engageable with each of said members to normally maintain same immovable with respect to its plate, a plurality of binding strips connecting said plates, each strip comprising a pair of resilient metallic protector plates arranged in parallel spaced relation, yokes interposed between said plates, said yokes being disposed at the respective ends thereof, a flexible element connecting the said yokes, and an eye at each end of the said retaining strip, the respective eyes being engageable with the respective locking members whereby the said binding strips are made rigid therewith.

4. In combination with a frame for binding loose leaves, binding strips, a locking element engageable with each of said strips, said element having a notch formed therein, a lock comprising a plurality of rotatable tumblers, each tumbler being provided with a radial slot, a locking bolt slidable within the slots of the respective tumblers when alined, said bolts being normally engageable with said locking element to maintain same immovable.

5. In a loose leaf binder, a plurality of flexible binding strips, the several strips having eyelets formed in their respective terminals, a bodily movable locking element, a plurality of pins varying in length forming a part of said elements, said pins adapted to be successively engaged with the eyelets aforesaid to lock the strips in place, and means movable into and out of engagement with each locking element, to render the latter movable or immovable as occasion may demand.

6. In a loose leaf binder, a frame, side plates rigid with said frame, said plates being bent longitudinally at an angle to the frame, a plurality of flexible binding strips, said binding strips having flat eyelets forming their respective terminals, and a locking element located in each side plate, each element including a plurality of flat locking pins engageable with the respective eyelets to cause the said binding strips to be turned outwardly and away from the frame upon an opening of the completed book.

7. In a loose leaf binder, a frame, side plates rigid with the frame, a plurality of flexible binding strips, said binding strips having eyelets formed in their respective terminals, a locking element located in each side plate, each element including a plurality of locking pins engageable with the respective eyelets of the binding strips to cause said strips to be turned outwardly and away from the frame upon the opening of the book, and auxiliary lock means engageable with each locking element.

8. In a loose leaf binder, a frame, side plates rigid with the frame, a plurality of flexible binding strips, said binding strips having flat eyelets formed in their respective terminals, a locking element located in each side plate, each element including a plurality of flat locking pins movable successively into or out of engagement with the respective eyelets therefor, the said strips when in engagement with the eyelets causing the binding strips to be turned outwardly and away from the frame upon opening of the completed book.

9. In a loose leaf binder, a frame for inclosing loose leaves, plate members rigid with the frame, a strip rigid with each member, the said strips defining a way extending longitudinally of the member, a locking element slidable in said way, a plurality of retaining strips varying in length integral with said element, and a plurality of binding strips connecting the respective plates, the said binding strips being engageable with the locking element.

10. In a loose leaf binder, the combination with a pair of locking elements, a plurality of binding strips engageable with each element, said binding strips each comprising a pair of parallel spaced resilient plates, yokes interposed between the plates, the yokes being disposed at the respective terminals thereof, flexible means connecting the yokes, and means rigid with the plates, the means being located at each end of the said strips, said means being engageable with the respective locking element.

In testimony whereof I affix my signature in presence of two witnesses.

GEORGE W. THOMAS.

Witnesses:
GRACE F. THOMAS,
W. C. RATCLIFF.